July 16, 1963     G. A. CUNNINGHAM     3,097,773
CHILD CARRIER
Filed March 14, 1960     2 Sheets-Sheet 1
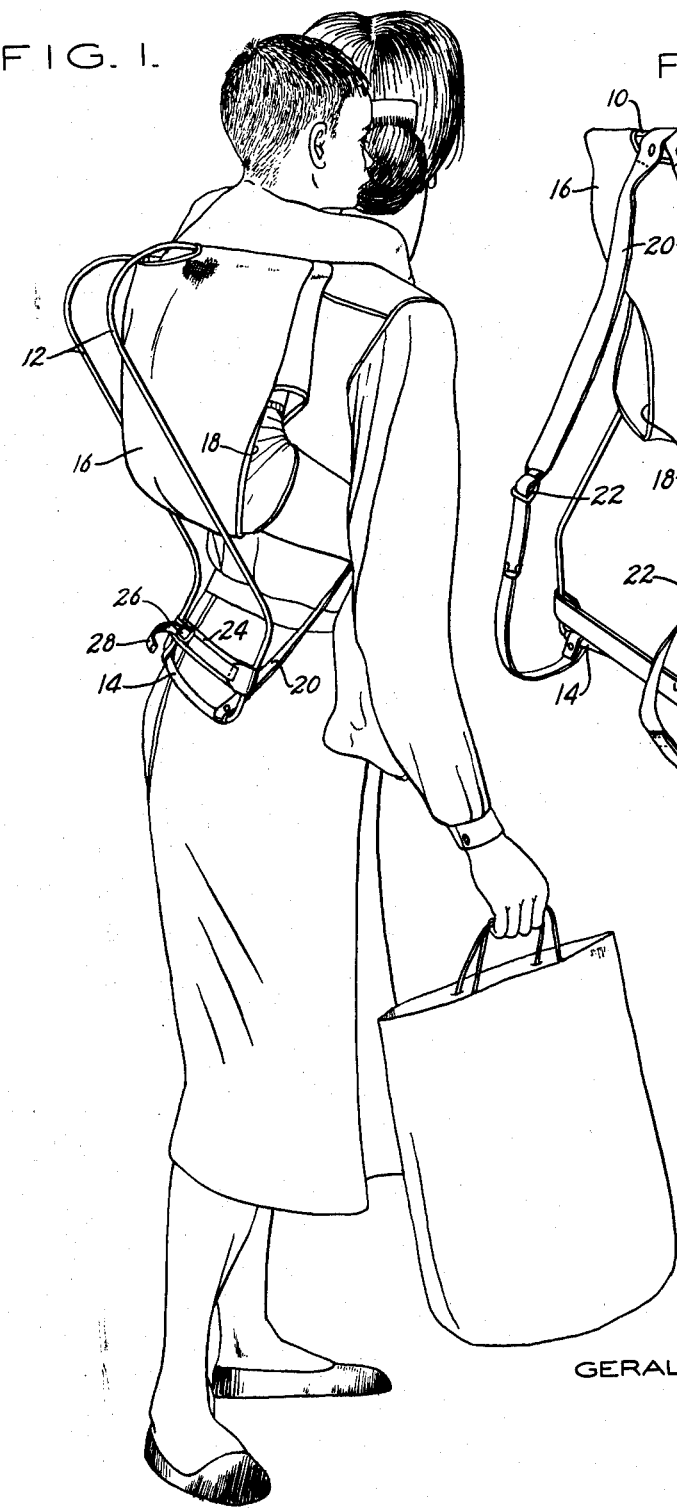
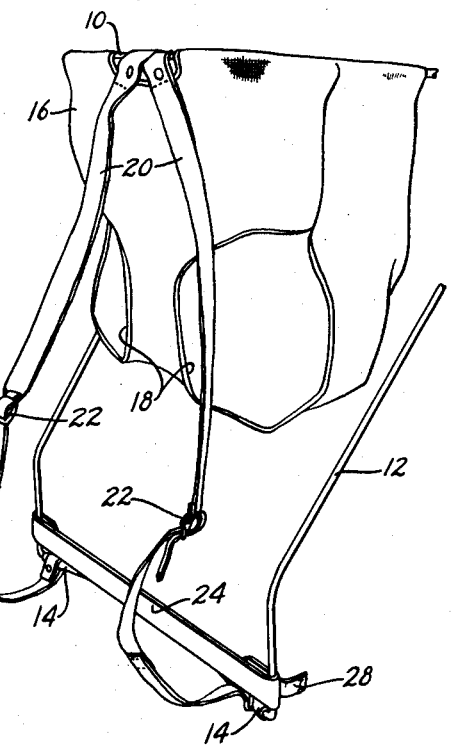
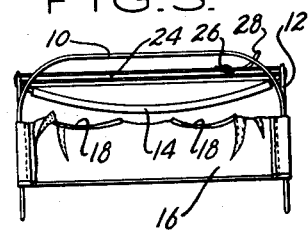
INVENTOR.
GERALD A. CUNNINGHAM

INVENTOR.
GERALD A. CUNNINGHAM
BY

United States Patent Office 3,097,773
Patented July 16, 1963

3,097,773
CHILD CARRIER
Gerald Arthur Cunningham, Box 128, Ward, Colo.
Filed Mar. 14, 1960, Ser. No. 14,780
1 Claim. (Cl. 224—6)

The present invention relates to child carriers and more particularly to a device for carrying a small child upon the back of an adult or other carrier person.

Although devices of the small vehicular type have been widely and successfully marketed for the carrying of infants and small children, these devices have a number of disadvantages. Except when smooth, paved areas for travel are available, these devices may be inconvenient or even impossible to use; a wheeled vehicular device obviously cannot travel everywhere that a person on foot can. Further, the necessity for the adult to provide the motive power to move the vehicular device prevents the adult from having his hands and mind free to perform other tasks. If a small child or infant can be carried upon the back of an adult comfortably and relatively effortlessly, this system would obviously do away with the disadvantages inherent in a small vehicular device.

Accordingly, a primary object of the instant invention is to provide a child carrier which will permit an adult to carry a child upon his back comfortably and with almost effortless ease, and one which will at the same time leave the adult's hands and arms free for any desired normal activity.

It is another object of the present invention to provide a child carrier which will permit a child to be carried upon the back of an adult in the natural piggy-back position, which will provide a much better distribution of load upon the adult than can be obtained without the carrier, and which will also provide for soothing and reasuring close body contact between the child and the body of the adult.

Another object of the invention is to provide a child carrier which will insure maximum safety for the child when he is in the carrying position.

Another object of the invention is to provide a frame which will allow the child to rest high on the back of the adult, distributing its weight most efficiently, forward over the legs of the adult, with no backward pull.

A further object of the invention is to provide a carrier which is simple, attractive in appearance, and inexpensive to manufacture.

Although there are other child carriers which utilize a frame to carry a child upon the back of an adult, there are none which permit the child to be carried in a natural piggy-back position in which he faces forward to give him a sense of security and comfort and in which the ideal possible weight distribution is provided for the adult carrying the load.

Additional objects and advantages of the invention will be set forth in part in the description which follows and in part will be obvious from the description, or may be learned by practice of the invention, the objects and advantages being realized and attained by means of the instrumentalities and combinations particularly pointed out in the appended claims.

The invention consists in the novel parts, constructions, arrangements, combinations, and improvements shown and described.

The accompanying drawings which are incorporated in and constitute a part of the specification, illustrate one embodiment of the invention and, together with the description, serve to explain the principles of the invention.

In the drawings:

FIG. 1 is a perspective view showing the carrier in use with the child resting in the piggy-back position on the adult;

FIG. 2 is a front perspective view of the carrier shown in a somewhat larger scale than in FIG. 1;

FIG. 3 is a fragmentary, plan view of the carrier looking down upon it from the top;

Figure 4:
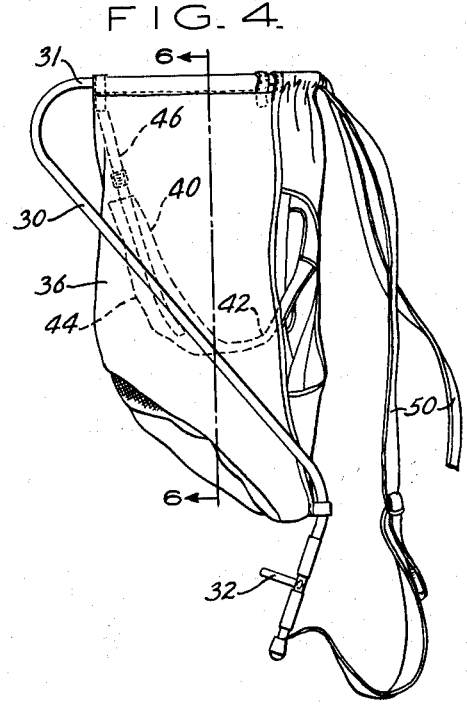
FIG. 4 is a side view of an alternative embodiment of the carrier.

It is to be understood that both the foregoing general description and the following detailed description are exemplary and explanatory but are not restrictive of the invention.

Reference will now be made to the drawings in which FIG. 2 shows the principal parts of the invention. The child carrier of the invention comprises a substantially inverted U-shaped frame, preferably constructed of metal, and in which the cross member 10 of the U is close to or in contact with the back of the carrying adult and approximately at shoulder height. The two downwardly extending legs 12 of the U initially extend away from the back of the adult and are substantially parallel to the ground; the legs then curve downward and then back toward the vicinity of the waist of the adult; from the waist they curve back outward slightly and follow the general contour of the adult's body below the waist for a short distance and are finally joined by a cross member 14 at the bottom (see FIG. 1). In FIG. 1, it can be seen that the legs 12 form a double bow or modified S curve and extend outwardly from the back of the adult near the shoulders so that the upper part of the legs 12 forms a cantilever type support.

A flexible pouch 16 made of cloth, such as light canvas, or made of a similar flexible material, is attached to and suspended from the cross member 10 of the U-shaped frame and the outwardly extending portions of the legs 12 which are substantially parallel to the ground. The pouch 16 is provided with two leg holes 18 through which the child places his legs while being carried and is sufficiently deep that a major portion of the child's torso is supported within it. A pair of shoulder straps 20 are attached to the cross member 10 of the U-shaped frame at the top and at their lower ends are attached to the connecting cross member 14 or the lower ends of the legs 12. The lower ends of the shoulder straps 20 are provided with adjustable buckles 22. The shoulder straps themselves are constructed of suitable, flexible material, such as the web belt material commonly employed by the U.S. Army.

The lower leg portions of the inverted U-shaped frame are connected just above the connecting cross member by a strong, flexible belt 24. The tension on the belt may be readily adjusted by a buckle 26 and adjusting strap 28 provided for this purpose. This connecting belt 24 forms an important part of the present invention since it rests comfortably in the vicinity of the small of the back of the adult carrier and smoothly transmits the bulk of the load from the cantilever portion of the inverted U-shaped frame to the strong bone and muscle structure of the hip and pelvic region of the adult. The combination of the cantilever type frame with the cross connecting belt at the bottom permits almost all of the load to be distributed to the pelvic region of the adult where it is scarcely felt and thus almost none of the load is carried on the shoulders of the adult, the shoulder strap serving primarily to hold the frame in place upon the back of the adult.

As may be seen in FIG. 1, the connecting belt 24 does not encircle the waist of the carrier person, but merely rests against the rear pelvic region below the small of the back. Although the bulk of the weight of the load of the child is transmitted through the flexible belt 24 to the rear hip and pelvic region of the carrier person, a portion of the child's weight is carried directly on the back of the carrier person. The child lies on the back of the carrier person, and is not just hung from the carrier person's back. The load is thus kept close to the carrier person's back, and that portion of the load which is not carried directly on the back is transmitted to the powerful bone and muscle structure of the rear pelvic region.

The simplicity of the design of this embodiment of the invention contributes to its convenience and its utility.

Figure 5:
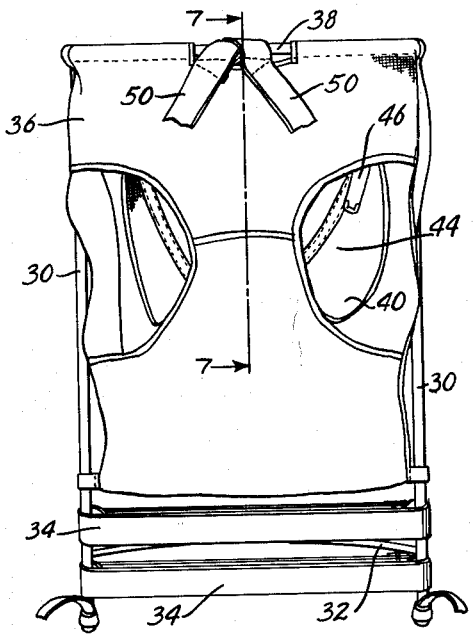
FIG. 5 is a front view of the embodiment shown in FIG. 4.
Figure 6:
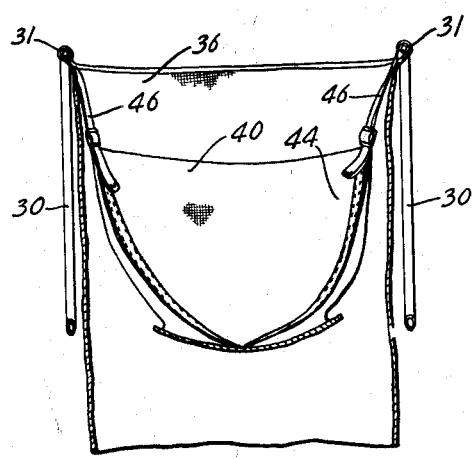
FIG. 6 is a vertical section taken along the line 6—6 of FIG. 4.
Figure 7:
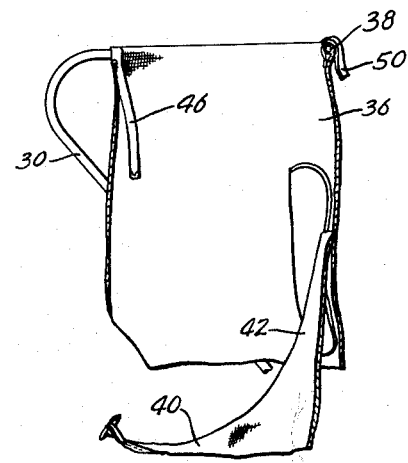
FIG. 7 is a vertical section taken along the line 7—7 of FIG. 5.

A second embodiment of the invention is shown in FIGS. 4 through 7. As its basic element, this form of the invention also employs an inverted U-shaped frame, preferably of metal tubing, such as steel or aluminum, and this frame has substantially the same configuration as that in the first embodiment described. Instead of a metal connecting member at the bottom of the legs 30 of the U-shaped frame, however, the instant embodiment employs a curved metal connecting member 32 approximately at the midpoint of the lower portion of the legs. Two adjustable, flexible supporting connectors 34 are spanned between the lower portions of the two legs 30, one above and one below the metal connecting member 32.

These two flexible, supporting connectors 34 perform the same function as the connecting belt 24 in the first embodiment of the invention (FIGS. 1–3), but in this embodiment the two flexible, supporting connectors 34 transmit the load and distribute it over a larger surface area of the small of the back or the back pelvic region of the adult.

A flexible cloth cover or pouch 36 is attached to and suspended from the cross member 38 of the inverted U-shaped frame and from the outwardly extending portions 31 of the legs 30 which are approximately parallel to the ground. The flexible pouch 36 is, thus, attached to and suspended from the frame in the same manner as the flexible pouch 16 of the first embodiment. In the present embodiment, however, a flexible drop seat 40 is suspended within the flexible pouch 36. The front or crotch portion 42 of the drop seat 40 is sewn, or attached in some fashion, to the interior side of the portion of the cloth pouch 36 which rests against the back of the carrying adult.

The rear or buttocks portion 44 of the drop seat 40 is attached by two adjustable straps 46 to the rear end of the contilever portion 31 of the legs 30. The flexible pouch 36 is provided with two leg holes 48 through which the legs of the child protrude as he is carried in the drop seat within the flexible pouch 36. Both the flexible pouch 36 and the drop seat 40 are constructed of a suitable flexible material, such as light canvas cloth.

It will be apparent from the construction of this embodiment of the carrier that a large proportion of the child's weight is transmitted from the adjustable straps 46 of the drop seat 40 to the rear cantilever portion 31 of the legs 30 and then through the downwardly extending portions of the legs 30 directly to the flexible supporting connectors 34 which in turn transmit and distribute the bulk of the load to the strong bone and muscle structure of the rear pelvic and hip region of the adult. The portion of the load that is not thus transmitted to the rear pelvic and hip region of the carrier person is carried directly on the back of the carrier person, as may be seen in FIG. 1.

The adjustable drop seat 40 also permits the child carrier in this embodiment to be adjusted to accommodate children of varying sizes and weights. As in the first embodiment, adjustable shoulder straps 50 are attached at their tops to the cross member 38 of the inverted U-shaped frame and at their bottoms to the bottoms of the downwardly-extending legs 30 of the frame. Also, as in the first embodiment, these shoulder straps 50 serve principally to hold the carrier in place upon the back of the adult more than they do to support the load, which is primarily transmitted and supported by the hip and rear pelvic region, and not by the shoulders.

In operation, the child carrier permits an adult to carry a child upon his back in the natural piggy-back position while supporting the bulk of the child's weight with the strong bone and muscle structure of the hip and rear pelvic region. These features of the invention make it possible for an adult to carry a child upon his back for substantial periods of time and over long distances without tiring. The child carrier permits the adult to assume a natural upright walking posture without backward pull and enables him to carry a child with relative ease.

The invention in its broader aspects is not limited to the specific embodiments shown and described, but also includes within the scope of the accompanying claims any departures made from such embodiments which do not depart from the principles of the invention and which do not sacrifice its chief advantages.

What is claimed is:

A child carrier assembly adapted to be detachably mounted to the back of a person comprising, in combination, a substantially rigid frame member having an upper cross member adapted to engage the shoulders of the carrier person, two top leg portions each of which is connected at one end to one end of said cross member and extending rearwardly and outwardly therefrom in substantially the same plane as said cross member, two inclined leg portions each of which is integrally secured at one end to the outer end of each top leg portion and extending inwardly and downwardly therefrom in angular relationship therewith in the direction of the waist portion of the carrier person which is to receive the carrier assembly, each of said inclined leg portions terminating at a point substantially in the vertical plane of said upper cross member, a pair of short bottom leg portions each of which is integrally connected at one end to the lower end of said vertical leg portions and extending downwardly and outwardly therefrom and adapted to engage the rear hip and pelvic region of the carrier person, connecting means secured adjacent the lower end of each of said short bottom leg portions connecting them to one another, and flexible strap means connected directly to and spanning the distance between said bottom leg portions and adapted to be engageable with the rear hip and pelvic region below the waist, and a flexible pouch for receiving a child, said pouch having a top portion secured only to said upper cross member and said top leg portions, said flexible pouch having leg holes therein in the forward facing portion thereof and adapted to surround and support a child from the crotch and buttocks to the upper portion of the torso in a natural forward facing piggy-back position and in body to body contact with the back of the carrier person, and a pair of shoulder straps each secured at one end to the upper cross member and adapted to be placed over the carrier person's shoulders, with the other end of each secured to the frame member adjacent the lower end of each of said short bottom leg portions.

References Cited in the file of this patent

UNITED STATES PATENTS

| 803,427 | Monroe | Oct. 31, 1905 |
| 2,316,456 | Robes | Apr. 13, 1943 |
| 2,346,989 | O'Brien | Apr. 18, 1944 |
| 2,822,117 | Mack | Feb. 4, 1958 |
| 2,836,334 | Davis | May 27, 1958 |

FOREIGN PATENTS

| 449,569 | Great Britain | June 30, 1936 |
| 61,077 | Norway | July 3, 1939 |